(12) United States Patent
Coleri Ergen et al.

(10) Patent No.: US 8,243,620 B2
(45) Date of Patent: Aug. 14, 2012

(54) METHOD FOR SETTING THE OPERATION OF A ROUTING NODE OF AN ASYNCHRONOUS WIRELESS COMMUNICATION NETWORK, NETWORK NODE AND COMMUNICATION NETWORK IMPLEMENTING THE METHOD

(75) Inventors: Sinem Coleri Ergen, Berkeley, CA (US); Carlo Fischione, Tornimparte (IT); Claudio Borean, Turin (IT)

(73) Assignees: Telecom Italia S.p.A., Milan (IT); Pirelli & C. S.p.A., Milan (IT)

( * ) Notice: Subject to any disclaimer, the term of this patent is extended or adjusted under 35 U.S.C. 154(b) by 0 days.

(21) Appl. No.: 13/125,520

(22) PCT Filed: Oct. 22, 2008

(86) PCT No.: PCT/EP2008/008925
§ 371 (c)(1),
(2), (4) Date: Apr. 21, 2011

(87) PCT Pub. No.: WO2010/045954
PCT Pub. Date: Apr. 29, 2010

(65) Prior Publication Data
US 2011/0211513 A1    Sep. 1, 2011

(51) Int. Cl.
*G01R 31/08* (2006.01)
(52) U.S. Cl. .................................. 370/252; 370/316
(58) Field of Classification Search .................. None
See application file for complete search history.

(56) References Cited

U.S. PATENT DOCUMENTS

| 7,035,240 | B1 | 4/2006 | Balakrishnan et al. |
| 7,522,547 | B2 * | 4/2009 | Lee et al. ............... 370/312 |
| 2010/0157865 | A1 * | 6/2010 | Iyer et al. ............... 370/311 |
| 2011/0128869 | A1 * | 6/2011 | Coleri Ergen et al. ... 370/252 |
| 2011/0211513 | A1 * | 9/2011 | Coleri Eregen et al. ... 370/311 |

OTHER PUBLICATIONS

J. Polastre et al., "Versatile Low Power Media Access for Wireless Sensor Networks", SenSys 2004, Nov. 2004, pp. 1-13.
M. Buettner et al., "X-MAC: A Short Preamble MAC Protocol for Duty-Cycled Wireless Sensor Networks", SenSys 2006, Nov. 2006, pp. 1-14.
P.G. Park, et al., "Breath: A Self-Adapting Protocol for Wireless Sensor Networks in Control and Automation", in Proc. SECON, 2008, pp. 323-331.

(Continued)

*Primary Examiner* — Robert Wilson
(74) *Attorney, Agent, or Firm* — Banner & Witcoff, Ltd.

(57) ABSTRACT

To reduce energy consumption in a duty-cycled asynchronous wireless communication network values of operation parameters, i.e. duration of the awake interval and duration of the sleep interval, of routing nodes of the network are determined and set. The network is partitioned into clusters so that each cluster comprises one cluster-head node. The energy consumption of a cluster is a function of the probability of busy channel when nodes of the cluster attempt transmission, the probability of communication collision during transmission, the duration of the awake interval and the duration of the sleep interval of its cluster-head node. Reduction of the energy consumption is carried out under predetermined values of the probability of busy channel and of the probability of communication collision and under predetermined constraint for the probability of successful transfer of data packets within the cluster and for the average delay of transfer of data packets within the cluster.

15 Claims, 6 Drawing Sheets

OTHER PUBLICATIONS

B. Bougard, et al., "Energy Efficiency of the IEEE 802.15.4 Standard in Dense Wireless Microsensor Networks: Modeling and Improvement Perspectives," in Proc. DATE, vol. 1, pp. 196-201, Design, Automation and Test in Europe (DATE'05) vol. 1, 2005.

D. Cho, et al., "An Adaptive Energy Saving Mechanism for the IEEE 802.15.4 LR-WPAN", in Proc. WASA, 2006, pp. 38-46.

Y. Zhang, et al., "Analysis of Energy Efficiency and Power Saving in IEEE 802.15.4", Wireless Comm. and Networking Conf., Mar. 2007, WCNC 2007, pp. 3332-3336.

F. Amini, et al., "Performance of IEEE 802.15.4 Clusters with Power Management and Key Exchange", presented at J. Comput. Sci. Technol., 2008, pp. 377-388.

Y. Huang, et al., "An Energy-Efficient MAC Design for IEEE 802.15.4-Based Wireless Sensor Networks", in Proc. EUC Workshops, 2007, pp. 237-248.

International Search Report and Written Opinion dtd Nov. 9, 2009, PCT/EP2008/008925.

* cited by examiner

Fig. 6

METHOD FOR SETTING THE OPERATION OF A ROUTING NODE OF AN ASYNCHRONOUS WIRELESS COMMUNICATION NETWORK, NETWORK NODE AND COMMUNICATION NETWORK IMPLEMENTING THE METHOD

CROSS REFERENCE TO RELATED APPLICATIONS

This is a U.S. National Phase application under 35 U.S.C. §371 of International Application No. PCT/EP2008/008925, filed Oct. 22, 2008, which was published Under PCT Article 21(2), the entire contents of which are incorporated herein by reference.

FIELD OF THE INVENTION

The present invention relates to a method for setting the operation of a routing node of an asynchronous wireless communication network and to a network node and a communication network implementing it.

BACKGROUND OF THE INVENTION

WPAN [Wireless Personal Area Network] networks are known for some years; a PAN [Personal Area Network] network can be defined as a computer network for communicating among devices close to one person; a WPAN network is a PAN network using wireless short-range communication technologies.

A communication technology which is very often used for implementing a WPAN network is ZigBee.

One of the main and recent applications of WPAN networks is WSN [Wireless Sensor Network] networks.

In a WPAN network the key components are the nodes of the network, also called devices. In general, a WPAN network may comprise a mixture of mains powered devices and battery powered devices; battery powered devices are designed to limit their energy consumption so to assure a long lifetime to their batteries. Providing efficient use of energy in WSN networks is particularly important in order to achieve long-term deployment of applications since the sensor network nodes may not be easily recharged or replaced when the energy of their battery is over.

The component of a node of a WPAN network which is primarily responsible for energy consumption is the radio transceiver (both when it transmits and when it receives); the typical and effective way of reducing energy consumption in an asynchronous WPAN network (a network wherein the nodes do not have a synchronized clock and therefore do not transmit and receive synchronously) is to use "duty-cycling", i.e. to let the radio transceiver of the devices operate intermittently for short intervals of times; in this way, the operation of each node is a periodic (fixed transceiver operation period) sequence of a (short) awake interval and a (long) sleep interval. Of course, this complicates the communication protocols used in WPAN networks.

From the prior art, there are known asynchronous WSN networks wherein all (or almost all) the nodes are battery powered and therefore are designed to limit energy consumption and wherein special MAC protocols are used to limit energy consumption of the radio transceivers.

The article by J. Polastre et al, "Versatile Low Power Media Access for Wireless Sensor Networks", SenSys 2004, November 2004, describes in detail one of such MAC protocols called "B-MAC" based on "preamble sampling". According to this protocol, when a sender node has data to transmit, it transmits a preamble that lasts at least as long as the sleep period interval of the receiver node (this duration is referred to as "preamble length"); when the receiver node wakes up (this happens according to a period referred to as "check interval"), it detects the preamble and stays awake to receive data. This article also mentions the use of a set of bidirectional interfaces that allow an application to change the "check interval" and the "preamble length" in order to optimize energy consumption, latency and throughput and adapt to changing network conditions.

The article by M. Buettner et al, "X-MAC: A Short Preamble MAC Protocol for Duty-Cycled Wireless Sensor Networks", SenSys 2006, November 2006, describes in detail another of such MAC protocols called "X-MAC" based on "preamble sampling" and a sequence of short fixed-length preambles. According to this protocol, when a source node has to transmit an information packet, its transmitter transmits a series of short and fixed-length preambles, each containing the address of the destination node; small pauses between preambles permit the receiver of the destination node to awake (according to its own internal operation schedule), to detect the preamble and to send an acknowledgment that stops the sequence of preambles and signals the availability of the destination node to receive data; non-destination receivers which overhear the strobed preambles can go back to sleep immediately, rather than remaining awake for receiving data. This article also describes an adaptive algorithm which can be used to dynamically adjust duty-cycle parameters in order to optimize for energy consumption per packet, latency or both.

A different approach for reducing energy consumption is disclosed by U.S. Pat. No. 7,035,240; this patent deals with a method and network architecture for implementing an energy efficient network. The network includes a plurality of nodes that collect and transmit data that are ultimately routed to a base station. The network nodes form a set of clusters with a single node acting as a cluster-head. The cluster-head advertises for nodes to join its cluster, schedules the collection of data within a cluster, and then transmits the data to the base station. A cluster can intelligently combine data from individual nodes. After a period of operation, the clusters are reformed with a different set of nodes acting as cluster-heads. The network provides an increased system lifetime by balancing the energy use of individual nodes.

SUMMARY OF THE INVENTION

The Applicant has considered that in asynchronous wireless communication networks, especially in WPAN/WSN networks, there is a need for a much better optimization of the energy consumption of network nodes with respect to known protocols for the following reasons.

The solution known from U.S. Pat. No. 7,035,240 is based on a high-level approach that requires load balancing and data aggregation in the cluster-head nodes of the network and provides for a synchronous network within each cluster of the network based on a TDMA [Time Division Multiple Access] schedule.

The solutions known from the two above-mentioned articles do not take into account the effect of random access which is a function of data traffic, MAC parameters and network topology and which is responsible for a large part of energy consumption; in other words, the energy consumption model is too simplified and can not lead to any true minimization.

The present invention aims at improving the solutions of the prior art.

In particular, the present invention addresses the problem of minimizing energy consumption in a duty-cycled asynchronous wireless communication network. The basic idea behind the present invention is to use an energy consumption model that takes into account the effect of random access; anyway, in order to simplify the model, the network is partitioned into a plurality of clusters so that each of said clusters comprises one cluster-head node; for the purpose of this partitioning, a cluster-head node is a routing node considered only receiving data packets from the other nodes of the cluster and the other nodes of the cluster are nodes considered only transmitting data packets to the cluster-head node—this means that according to this partitioning clusters may partially overlap.

In order to build the model, the Applicant has considered that when transmission within a cluster is attempted by any of the nodes of the cluster a probability of busy channel is encountered, that when transmission within a cluster is carried out by any of the nodes of the cluster a probability of communication collision is encountered, and that a data packet is transferred within a cluster with a probability of successful transfer (which may be called "reliability") and with an average delay of transfer (which may be called "latency"); additionally, the Applicant has considered the influence of the number of nodes of the clusters and of the average data packet generation rate according to which data packets are transmitted by the nodes of the clusters. According to the herein proposed model, the energy consumption of a cluster is a function primarily of the probability of busy channel, the probability of communication collision, the duration of the awake interval and the duration of the sleep interval of the cluster-head node; additionally, the energy consumption is a function of the number of nodes of the cluster and the average data packet generation rate.

Minimization of the energy consumption is carried out under predetermined values of the probability of busy channel and of the probability of communication collision and under predetermined constraint for the probability of successful transfer and for the average delay of transfer; in this way, optimal values of the duration of the awake interval and the duration of the sleep interval of the cluster-head node are determined. Once these optimal values are determined, they are set and used as operation parameters of the cluster-head node.

The partitioning of the network into a plurality of clusters may be fixed and predetermined; alternatively, it may be one of the steps to be carried out according to the present invention only once or repeatedly, for example periodically.

It is to be noted that, in general, the operation parameters of the various routing nodes of the network will be different.

The determination of the optimal operation parameters may be repeated, e.g. periodically, during the operation of the network. This is advantageous for example if the probability of busy channel or the probability of communication collision or both such probabilities change during the operation of the network. These two probabilities may be determined by each routing node of the network during its operation; in particular, the probability of busy channel may be determined by receiving estimates of the probability of busy channel made by the other nodes of the same cluster and by calculating an average or the maximum of the received estimates.

The optimal values of the operation parameters may be determined by each routing node of the network during its operation; in order to do this quickly and by means of a simple hardware, such determination may be based on a table of pre-calculated values; such table may be stored inside each routing node; such storage into the routing nodes may be carried out e.g. by a base station; such base station may have calculated all the values of the table or tables before the network starts operating.

According to further aspects, the present invention relates to a network node and a communication network implementing the above method that minimizes energy consumption.

BRIEF DESCRIPTION OF THE DRAWINGS

The present invention will become more apparent from the following description to be considered in conjunction with the annexed drawing, wherein.

It is to be understood that the following description and the annexed drawings are not to be interpreted as limitations of the present invention but simply as exemplifications.

DETAILED DESCRIPTION OF THE INVENTION

The embodiment of the present invention that will be described in the following relates to a WPAN [Wireless Personal Area Network] network, specifically a WSN [Wireless Sensor Network] network using the ZigBee technology, even if the present invention may be applied more in general to an asynchronous wireless communication network. The operation of a network node is timed by means of an own clock signal which is generated by a timer (usually a local timer) though e.g. a quartz crystal; the timer is used by the network node also for measuring the duration of time intervals. As already explained, a network is defined as "asynchronous" if its nodes do not have a synchronized clock and therefore do not transmit and receive synchronously.

The operation of a duty-cycled asynchronous wireless communication network is known and is described e.g. in the already-cited article by M. Buettner; additionally, this article describes a MAC protocol based on the transmission of a sequence of short fixed-length preambles, as it is the case of the embodiment of the present invention that will be described in the following.

Figure 1:
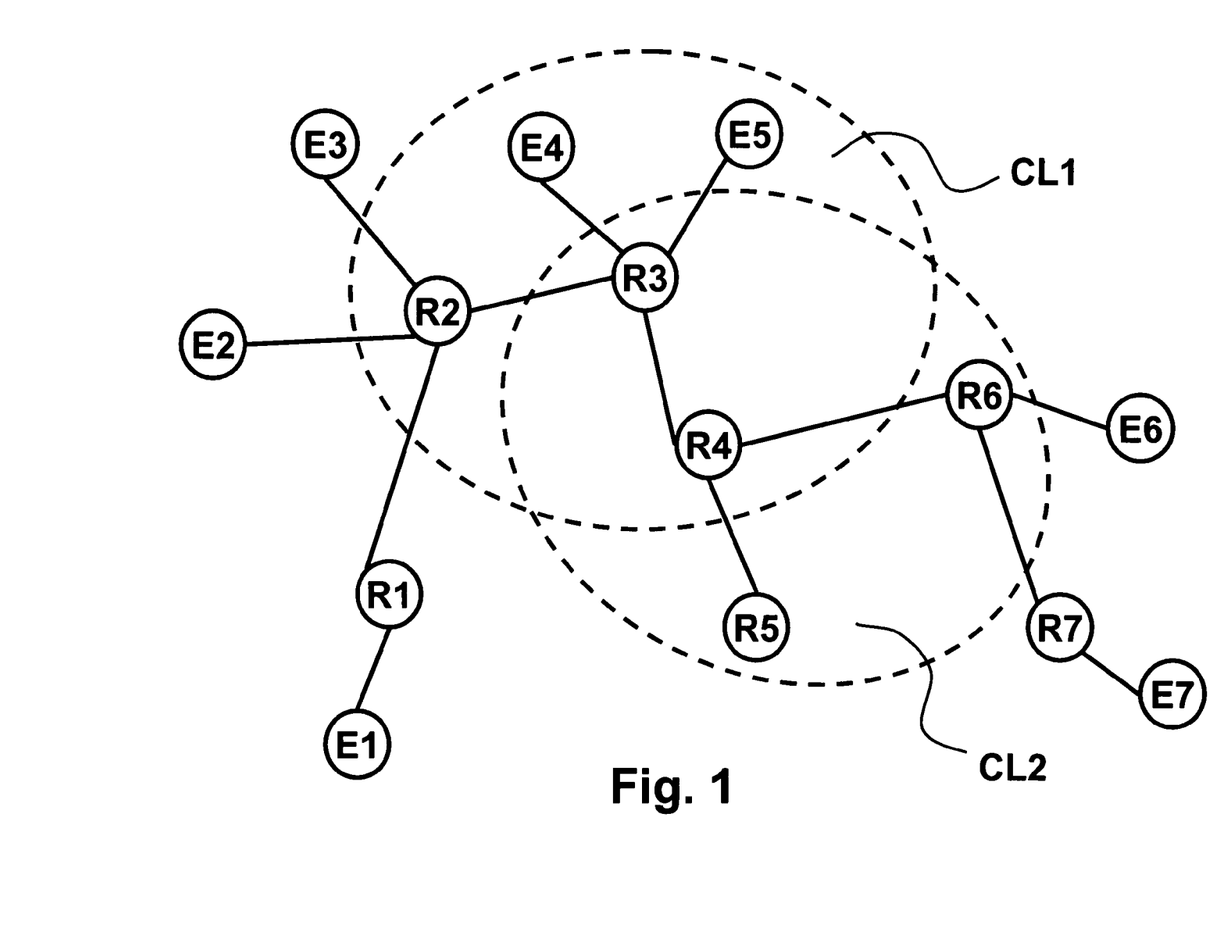
FIG. 1 shows a duty-cycled asynchronous wireless communication network according to the present invention wherein a first cluster and a second cluster are highlighted.

FIG. 1 shows a WSN network according to the present invention and embodying a ZigBee mesh topology. This network comprises seven routers, R1, R2, R3, R4, R5, R6, R7, and seven end devices, E1, E2, E3, E4, E5, E6, E7.

Figure 2:
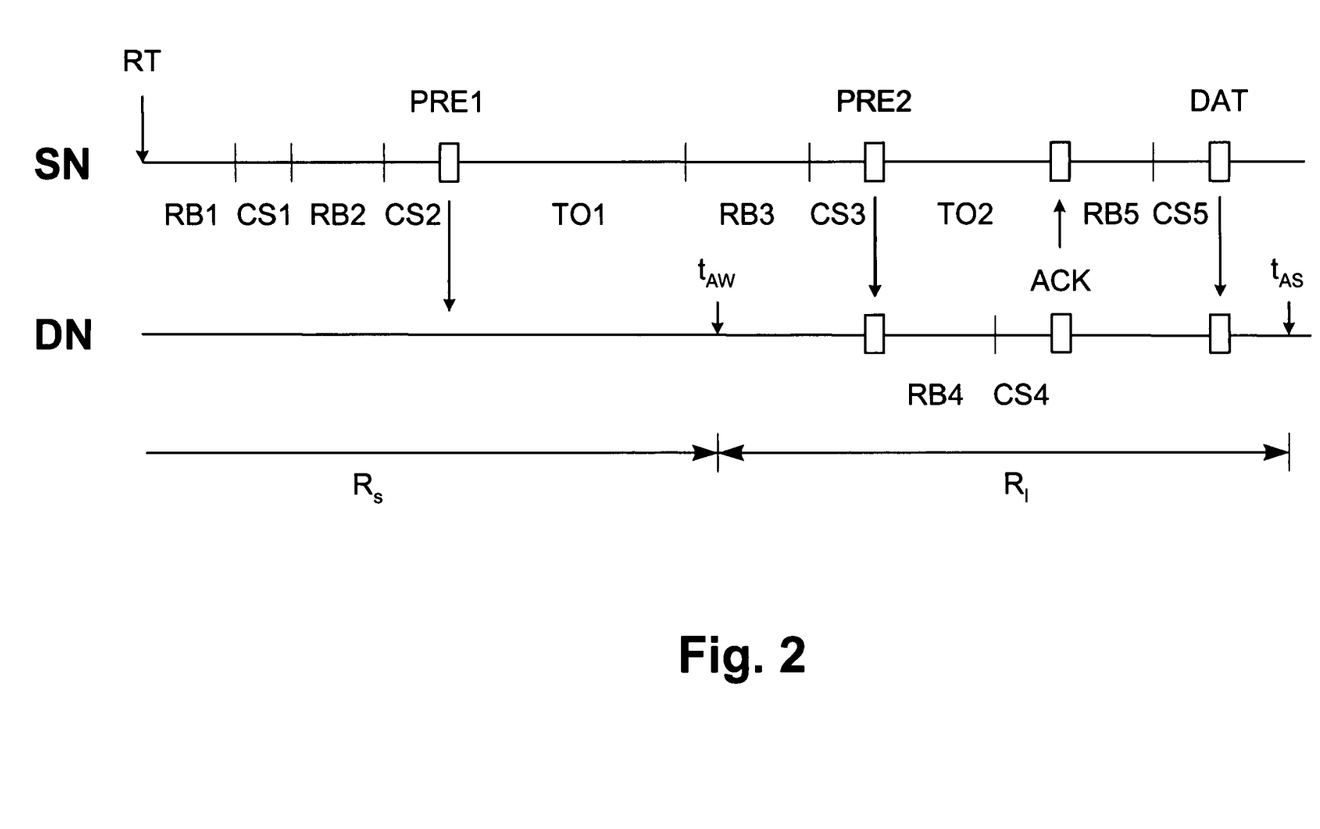
FIG. 2 shows time diagrams explaining the operation of a source node and a destination node according to an asynchronous duty-cycling MAC protocol based on preamble sampling with multiple short preambles.

FIG. 2 shows time diagrams explaining the operation of a source node SN (for example node E4) and a destination node DN (for example node R3) when data is to be transmitted from the source node SN to the destination node DN in the network of FIG. 1.

According to a "duty-cycled" transmission scheme, the destination node DN wakes up periodically for checking whether there is data for it from e.g. the source node SN; if yes, it receives data; if not, it returns to sleep; this is repeated periodically; the time spent in sleep state is called "sleep time" and corresponds to the duration of a sleep interval $R_s$ and the time spent in awake state is called "awake time" and corresponds to the duration of an awake interval $R_I$.

In "preamble sampling" MAC protocols, when the source node has data to transmit to the destination node, it transmits a series of short preamble packets, each containing the identifier of the destination node, until it either receives an acknowledgement packet from the destination node or a "time-limit" TL is exceeded which corresponds to the maximum sleep time of a destination node—in the example of FIG. 2, an acknowledgement packet ACK is received by the source node SN after the transmission of only two preamble packets PRE1 and PRE2.

In general, if a destination node wakes up and detects no radio signals in the communication channel, it returns to sleep immediately; if the destination node receives a preamble packet, but it is not the target of that preamble packet, it returns to sleep after this check; if the destination node receives a preamble packet and it is the target of that preamble packet, it transmits an acknowledgement packet to the source node after reception of the preamble packet. After reception of the acknowledgement packet, the source node transmits a data packet to the destination node.

The diagrams of FIG. 2 shows further details connected to such communication; it is to be highlighted that the sequence of events in FIG. 2 is only one of the many possibilities that may occur during operation of the network of FIG. 1.

A request of transmission RT is sent to the MAC layer from an upper layer of the source node SN and a random amount of time RB1 (called "random backoff") is spent before the communication channel is sensed; channel sensing is carried out during a short time interval CS1; at this moment, there are radio signals in the communication channel, i.e. the channel is busy (typically is used by another node for transmission), therefore another random amount of time RB2 is spent and then the channel is sensed again during a time interval CS2; now, the channel is available and therefore a preamble packet PRE1 is transmitted by the source node SN.

After the transmission of the preamble packet PRE1, the source node SN spends a time interval TO1 waiting for a reply from the destination node DN; in this case, the time interval TO1 lasts as a "time-out" TO; during the time interval TO1, the destination node DN does not reply as the destination node DN was asleep when the preamble packet PRE1 was transmitted.

After the time interval TO1, as the destination node DN has not replied, a random amount of time RB3 is spent before the communication channel is sensed during a time interval CS3 (the channel is found available) and a preamble packet PRE2 is transmitted by the source node SN; during the random amount of time RB3, the destination node DN wakes up (time instant $t_{AW}$ in FIG. 2).

After the transmission of the preamble packet PRE2, the source node SN spends a time interval TO2 waiting for a reply from the destination node DN; in this case, the time interval TO2 lasts less than the "time-out" TO as the destination node DN was awake when the preamble packet PRE2 was transmitted and has replied to the source node SN.

After the reception of the preamble packet PRE2, the destination node DN spends a random amount of time RB4 before sensing the communication channel during a time interval CS4 (the channel is found available) and transmitting an acknowledgement packet ACK to the source node SN.

After the reception of the acknowledgement packet ACK, the source node SN spends a random amount of time RB5 before sensing the communication channel during a time interval CS5 (the channel is found available) and transmitting a data packet DAT to the destination node DN.

After the transmission of the acknowledgement packet ACK, the destination node DN simply waits for the data packet DAT and returns to sleep (time instant $t_{AS}$ in FIG. 2) after having received the data packet DAT.

In "preamble sampling" protocols, the amount of time spent in random access for transmitting a data packet is in general much larger than the amount of time spent in transmission (for example, according to IEEE 802.15.4 with default parameters setting, the maximum backoff time before data packet transmission is 27.4 ms whereas the transmission time of a 56 byte data packet is 1.79 ms at 250 kbps); random access depends on data traffic, MAC parameters and network topology; random access causes energy consumption; therefore, a precise energy consumption model should take into account also random access.

For the energy consumption model according to the present invention, it is assumed that the nodes of the network are organized into clusters; the same model will be applied to each cluster.

In a clustered topology, nodes are organized in clusters with one node which acts as cluster-head node (it is a routing node); all the nodes of the clusters (except the cluster-head node) transmit their data directly to the cluster-head node.

If the network has a "tree" topology, the cluster-head nodes receive data from all the other nodes of the clusters (that are end devices) and forwards them to a base station that acts as coordinator node; if the network has a "mesh" topology, the cluster-head nodes receives data from all the other nodes of the clusters and forwards them to router nodes.

The application of the energy consumption model according to the present invention to a "tree" topology is straightforward.

In order to apply this model to a "mesh" topology, the network is partitioned into a plurality of clusters so that each of said clusters comprises one cluster-head node; for the purpose of this partitioning, a cluster-head node is a routing node considered only receiving data packets from the other nodes of the cluster and the other nodes of the cluster are nodes considered only transmitting data packets to the cluster-head node; in order to take account of the fact that a routing node may not only receive but also transmit data packets, a routing node belongs in general to at least two different clusters but it is the cluster-head node of only one cluster; this means that, according to this partitioning, clusters may partially overlap.

With reference to FIG. 1, a first cluster CL1 of the network comprises routers R2, R3 and R4 and end devices E4 and E5 and considers router R3 as its cluster-head node, and a second cluster CL2 of the network comprises routers R3, R4, R5 and R6 and no end devices and considers router R4 as its cluster-head node; therefore, nodes R3 and R4 belongs to two different clusters, i.e. CL1 and CL2, but when considering the first cluster CL1 node R3 only receives data packets and node R4 only transmits data packets and when considering the second cluster CL2 node R3 only transmits data packets and node R4 only receives data packets. It is to be understood that the complete partitioning of the network of FIG. 1 provides for seven clusters, one for each router of the network.

Throughout the present description, it is assumed that the data packet generation rate of the nodes of the network is such that during a time duration given by the duration of the sleep interval plus the duration of the awake interval, a node has at maximum one data packet to transmit. Consequently, if a node can not transmit a data packet within $R_l + R_s$, then the packet is discarded.

In the following, the acronyms "RX" and "rx" will often be used instead of "receiver" or "receiving node" and the acronyms "TX" and "tx" will often be used instead of "transmitter" or "transmitting node".

All the symbols in the following mathematical expressions are listed and explained in the below table.

| Symbol | Meaning |
| --- | --- |
| TX node | a transmitter node |
| RX node | a receiver node (cluster head) |
| $T_1$ | random delay spent by the TX node before actually transmitting a preamble packet |
| $T_2$ | random delay spent by the TX node from the beginning of a transmission until the reception of the acknowledgement |
| $T_3$ | random delay spent by the TX node from the instant of acknowledgement reception until the transmission of a data packet |
| $T_P$ | random delay to wait before a data packet is successfully received |
| $T_s$ | random sleep time of the RX as seen from the TX (it is uniformly distributed over $[0, R_s]$) |
| $T_s$ | random listening time of the RX as computed upon the reception of a preamble (it is uniformly distributed over $[0, R_l]$) |
| $T_{ack}$ | random time before the RX node can access the channel and send an acknowledgement. |
| $T_{TX,out}$ | maximum time that a TX node waits for an ACK after having sent a preamble. |
| $T_{out}$ | maximum time that a TX node waits from the moment of the reception of an ACK before giving up the data packet transmission. |
| $N_P$ | maximum number of preambles that can be sent |
| $N_b$ | maximum number of back-off to sense the channel for sending a preamble packet |
| $NB_{max}$ | maximum number of back-offs before declaring a channel access failure |
| N | number of nodes in a cluster |
| λ | packet generation rate per node |
| $d_{TX}$ | probability that a TX node has a packet to send in the interval $R_s + R_l$ |
| c | probability of busy channel |
| b | probability of preamble collision |
| p | probability of data packet collision |
| $\psi_{min}$ | minimum probability of successful packet transmission (reliability requirement) |
| $\tau_{max}$ | maximum probability of maximum delay (latency requirement) |
| $E_{max}$ | maximum energy consumption per listening-sleeping cycle (energy requirement) |
| $S_{p,j}$ | j-th random back-off time of a preamble |
| $\mu S_{p,j}$ | average of $S_{p,j}$ |
| $S_c$ | time duration of channel sensing for clear channel assessment |
| $S_p$ | time duration of a preamble packet |
| $S_a$ | time duration of an acknowledgement packet |
| $S_d$ | time duration of a data packet |
| $S_b$ | time duration of forming the basic time period used by the CSMA/CA algorithm |
| $R_s$ | sleep time of the receiver node (cluster head) |
| $R_l$ | active time of the receiver node (cluster head) |
| $A_k$ | event occurring when the channel is busy for k-1 times |
| $B_k$ | event occurring when a preamble has to be sent k times before being received in the active time of the RX node and the corresponding acknowledgement is sent by the RX node and received before the time out of the TX node |
| G | event that occurs when a preamble is successfully received during the active state of the receiver |
| H\|G | event that occurs when the ACK is successfully sent before the time out of the RX expires provided that a preamble is successfully received |
| I\|G, H | event that occurs when the TX sends successfully a data packet provided that a preamble is successfully received and the ACK is also successfully received |
| $P_{tx}$ | transmit power |
| $P_{rx}$ | receive power |
| $P_s$ | sleep power | where $E_{Ta}$ and $E_{Tl}$ denote the statistical average with respect to the distribution of $T_a$ (T subscript A) and $T_l$ (T subscript L) respectively; $T_a$ (T subscript A) is the random time to wait from the beginning of the transmissions until the start of the awake interval, $T_l$ (T subscript L) is the time duration from the moment in which the preamble packet is received during the awake interval until the awake interval expires, $T_p$ is the delay to wait before a data packet is successfully received, $t_{max}$ is the maximum delay desired by the application, c is the probability of communication collision.

The probability that a packet is delayed of $t_{max}$ or less than $t_{max}$ is given by the following expression Modelling of the Delay The probability of the delay for transferring a data packet from a source node (transmitting node) to a destination node (receiving node or cluster-head node) is given by the following expression $$E_{Ta} E_{Tl} Pr[(T_p \leq t_{max})(T_3 \leq T_{out})] \triangleq D_{max}(R_l, R_s, T_{TX,out}, T_{out}, c; t_{max})$$

$$Pr(T_p \leq t_{max}) = \frac{1}{2}\left(1 + \text{erf}\left(\frac{x - \mu_{T_p}}{\sigma_{T_p}\sqrt{2}}\right)\right)$$

The mean and variance of $T_p$ are given by the following expressions $$\mu_{T_p} = \mu_{T_2} + \mu_{T_3}$$

$$\sigma_{T_p}^2 = \sigma_{T_2}^2 + \sigma_{T_3}^2$$

where $\mu_{T_p}$ and $\sigma_{T_p}$ are the mean and variance of $T_p$ respectively, $T_2$ is the period of time spent by the TX node from the moment when the data packet is internally generated until a corresponding acknowledgement packet reaches the TX node and $T_3$ is the period of time spent by TX node starting just after the acknowledgment packet is received and ending just before the data packet is transmitted.

The mean and variance of $T_2$ are given by the following expressions $$\mu_{T_2} = \sum_{k=1}^{N_p} [k\mu_{T_1} + \mu_{T_{ack}} + (k-1)T_{TX,out}] \frac{Pr[\mathcal{B}_k]}{\sum_{k=1}^{N_p} Pr[\mathcal{B}_k]}$$

$$\sigma_{T_2}^2 = \sum_{k=1}^{N_p} (k^2\sigma_{T_1}^2 + \sigma_{T_{ack}}^2) Pr[\mathcal{B}_k].$$

where $$Pr[\mathcal{B}_k] = (Pr[\mathcal{C}_k \mathcal{E}_k] - Pr[\overline{\mathcal{D}}_k])Pr[T_{ack} \leq T_{TX,out}](1-b)^2 + (Pr[\mathcal{E}_k] - Pr[\mathcal{C}_k \mathcal{E}_k])Pr[T_{ack} \leq T_{TX,out}]b(1-b)^2 + (Pr[\mathcal{E}_k] - Pr[\mathcal{C}_k \mathcal{E}_k])(1-Pr[T_{ack} \leq T_{TX,out}])Pr[T_{ack} \leq T_{TX,out}](1-b)^3 + (Pr[\mathcal{E}_k] - Pr[\mathcal{C}_k \mathcal{E}_k])(Pr[T_{ack} \leq T_{TX,out}])^2 b(1-b)^3,$$

where $$Pr[\mathcal{C}_k] = P_1\left(\frac{T_a - (k-2)T_{TX,out}}{k-1}\right),$$

$$Pr[\overline{\mathcal{D}}_k] = P_1\left(\frac{T_a - (k-1)T_{TX,out}}{k}\right),$$

$$Pr[\mathcal{E}_k] = P_1\left(\frac{T_a + T_l - (k-1)T_{TX,out}}{k}\right),$$

$$Pr[\mathcal{C}_k \mathcal{E}_k] = Pr[\mathcal{C}_k]Pr[T_1 \leq T_l - T_{TX,out}] + Pr[\mathcal{E}_k](1 - Pr[T_1 \leq T_l - T_{TX,out}]).$$

and $$Pr[T_1 \leq t] = \frac{1}{2}\left(1 + \text{erf}\left(\frac{x - \mu_{T_1}}{\sigma_{T_1}\sqrt{2}}\right)\right) \triangleq P_1(t)$$

As it appears from the above expressions, the mean and variance of $T_2$ are related to the mean and variance of $T_1$ (the period of time spent by TX node from the moment when the data packet is internally generated until the first corresponding preamble packet is actually transmitted) that are given by the following expressions $$\mu_{T_1} = \mathbb{E}T_1 = \sum_{k=1}^{N_b} \mu_{\Sigma_k} \frac{Pr[\mathcal{A}_k]}{\sum_{k=1}^{N_b} Pr[\mathcal{A}_k]} = \sum_{k=1}^{N_b} \mu_{\Sigma_k} \frac{c^{k-1}(1-c)}{\sum_{k=1}^{N_b} c^{k-1}(1-c)},$$

$$\rho_{T_1} = \mathbb{E}T_1^2 = \sum_{k=1}^{N_b} \rho_{\Sigma_k} \frac{c^{k-1}(1-c)}{\sum_{k=1}^{N_b} c^{k-1}(1-c)}.$$

$$\sigma_{T_1}^2 \triangleq \rho_{T_1} - \mu_{T_1}^2$$

where $$\mu_{\Sigma_k} = \mathbb{E}[\Sigma_k] = \sum_{j=1}^{k} [\mu_{S_{p,j}} + S_c].$$

$$\sigma_{\Sigma_k}^2 = \mathbb{E}[\Sigma_k - \mathbb{E}\Sigma_k]^2 = \sum_{j=1}^{k} \sigma_{S_{p,j}}^2.$$

$$\rho_{\Sigma_k} = \sigma_{\Sigma_k}^2 + \mu_{\Sigma_k}^2$$

where $$\mu_{S_{p,j}} = \begin{cases} \frac{(2^{r(j)} - 1)S_b}{2}, & \text{for } r(j) = 1, \ldots, BE_{max}; \\ \frac{(2^{BE_{max}} - 1)S_b}{2}, & \text{for } r(j) > BE_{max}. \end{cases}$$

$$\sigma_{S_{p,j}}^2 = \begin{cases} \frac{(2^{2r(j)} - 1)S_b^2}{12}, & \text{for } r(j) = 1, \ldots, BE_{max}; \\ \frac{(2^{2BE_{max}} - 1)S_b^2}{12}, & \text{for } r(j) > BE_{max}. \end{cases}$$

$$r(j) = \text{rem}(j, NB_{max} + 1)$$

As it appears from the above expressions, the mean and variance of $T_2$ are related also to the mean and variance of $T_{ack}$ (the period of time from the end of the transmission of a preamble packet until the end of the transmission of the corresponding acknowledgement packet) that are given by the following expressions $$f_{T_{ack}} \sim \frac{1}{\sigma_{T_{ack}}\sqrt{2\pi}} \exp\left(-\frac{(x - \mu_{T_{ack}})^2}{2\sigma_{T_{ack}}^2}\right)$$

$$\mu_{T_{ack}} = \sum_{k=1}^{N_a} \mu_{\Sigma_k} \frac{c^{k-1}(1-c)}{\sum_{k=1}^{N_a} c^{k-1}(1-c)},$$

$$\rho_{T_{ack}} = \sum_{k=1}^{N_a} \rho_{\Sigma_k} \frac{c^{k-1}(1-c)}{\sum_{k=1}^{N_a} c^{k-1}(1-c)},$$

$$\sigma_{T_{ack}}^2 \triangleq \rho_{T_{ack}} - \mu_{T_{ack}}^2.$$

The mean and variance of $T_3$ is given by the following expressions $$\mu_{T_3} = \sum_{k=1}^{N_d} \mu_{\Sigma_k} \frac{c^{k-1}(1-c)}{\sum_{k=1}^{N_a} c^{k-1}(1-c)},$$

$$\rho_{T_3} = \sum_{k=1}^{N_d} \rho_{\Sigma_k} \frac{c^{k-1}(1-c)}{\sum_{k=1}^{N_a} c^{k-1}(1-c)},$$

$$\sigma_{T_3}^2 \triangleq \rho_{T_3} - \mu_{T_3}^2.$$

Modelling of the Reliability

The probability to transfer a data packet successfully from a source node (transmitting node) to a destination node (receiving node or cluster-head node), which may be called "reliability", is given by the following expression $$R_{min}(R_l,R_s,T_{TX,out},T_{out},c,p) = \mathbb{E}_{T\alpha}\mathbb{E}_{T_l}Pr[\mathcal{G}]Pr[I|\mathcal{G}].$$

where the probability that a preamble packet is successfully transmitted during the awake interval of the RX node and the corresponding acknowledgement packet is successfully transmitted before the timeout of the TX node expires is given by the following expression $$Pr[\mathcal{G}] = \sum_{k=1}^{N_p} Pr[\mathcal{B}_k].$$

the probability that the TX node transmits a data packet successfully, given that a preamble packet is successfully received and the acknowledgement packet is also successfully received, is given by the following expression $$Pr[\mathcal{I}|\mathcal{G}] = (1-c^{NB_{max}})(1-c^{N_a})(1-c^{N_d})(1-p).$$

Modelling of the Energy Consumption

The average energy consumption (in other words the expected value $\mathbb{E}$ of the total energy $E_{tot}$), normalized by $R_l+R_s$, for each cluster of the network is given by the following expression:

$$\mathbb{E}E_{tot} = (Nd_{TX}\mathbb{E}E_{tx} + \mathbb{E}E_{rx})/R_s + R_l)$$

where N is the number of transmitting nodes in the cluster (equal to the total number of the nodes of the cluster minus one, i.e. the cluster-head node) and $d_{TX}$ is the probability that a transmitting node has at least one data packet to transmit to the cluster-head node during the time interval of $R_l+R_s$, i.e. $d_{TX}=1-e^{-\lambda(R_s+R_l)}$, where $\lambda$ is the average data package generation rate.

In this expression, the first addend is the average energy consumption of the transmitting nodes and the second addend is the average energy consumption of the receiving node, i.e. the cluster-head node.

The average energy consumption of one transmitting node is given by the following expression $$\mathbb{E}E_{tx} = \sum_{i=1}^{N_p} \left\{ i\mathbb{E}[E_{tx,T_1}] + (i-1)\mathbb{E}E_{T_{TX,out}} + \mathbb{E}[E_{tx,T_{ack}}] + \mathbb{E}E_{tx,T_{data}} \right\} Pr[\mathcal{B}_i] + \left(N_p E_{tx,T_1} + (N_p-1)E_{T_{TX,out}} + E_{tx,T_{ack}}\right)\left(1 - \sum_{i=1}^{N_p} Pr[\mathcal{B}_i]\right).$$

The first line in the above equation corresponds to the energy spent in the case of successful data packet transmission and the second line corresponds to the energy spent in the case of unsuccessful data packet transmission. The four addends in the first line of the above expression are, respectively, the energy for accessing the channel and transmitting "i" preamble packets given that the event $B_1$ occurs, namely the i-th preamble packet was successfully transmitted and the corresponding acknowledgment packet was successfully received, the energy spent during "i−1" (fixed) time out periods of the TX node for the preamble packets, the energy for receiving an acknowledgement packet, the energy for transmitting a data packet.

The three addends in the second line of the above expression are, respectively, the energy spent when $N_p$ (the maximum number of preamble packets) preamble packets are transmitted but no data packet is transmitted since either the channel is busy or the awake interval of the receiving node has been missed due to collisions or random backoff.

These addends are defined by the following expressions $$\mathbb{E}E_{tx,T_1} = \sum_{j=1}^{N_b}\left[\sum_{k=1}^{j}\left(P_s\mu_{S_{p,k}} + P_{rx}S_c\right) + P_{tx}S_p\right]Pr[\mathcal{A}_j],$$

$$E_{T_{TX,out}} = T_{TX,out}P_{rx},$$

$$\mathbb{E}E_{tx,T_{ack}} = \sum_{j=1}^{N_a}\left[\sum_{k=1}^{j}\left(\mu_{S_{p,k}} + S_c\right) + S_a\right]P_{rx}Pr[\mathcal{A}_j],$$

$$\mathbb{E}E_{tx,T_{data}} = \sum_{j=1}^{N_d}\left[\sum_{k=1}^{j}\left(P_s\mu_{S_{p,k}} + P_{rx}S_c\right) + P_{tx}S_d\right]Pr[\mathcal{A}_j] + \left[\sum_{k=1}^{N_d}\left(P_s\mu_{S_{p,k}} + P_{rx}S_c\right) + P_{tx}S_d\right]Pr[\overline{\mathcal{A}}],$$

In these equations, the following terms have been used:
$Pr[B_k] = (Pr[C_k E_k] - Pr[\overline{D}_k])Pr[T_{ack} \leq T_{TX,out}](1-b)^2 + (Pr[E_k] - Pr[C_k E_k])Pr[T_{ack} \leq T_{TX,out}]b(1-b)^2 + (Pr[E_k] - Pr[C_k E_k])(1 - Pr[T_{ack} \leq T_{TX,out}])Pr[T_{ack} \leq T_{TX,out}](1-b)^3 + (Pr[E_k] - Pr[C_k E_k])(Pr[T_{ack} \leq T_{TX,out}])^2 b(1-b)^3,$ where $$Pr[C_k] = P_1\left(\frac{T_a - (k-2)T_{TX,out}}{k-1}\right),$$

$$Pr[\overline{D}_k] = P_1\left(\frac{T_a - (k-1)T_{TX,out}}{k}\right),$$

$$Pr[\mathcal{E}_k] = P_1\left(\frac{T_a + T_l - (k-1)T_{TX,out}}{k}\right),$$

$Pr[C_k \mathcal{E}_k] =$
$\quad Pr[C_k]Pr[T_1 \leq T_l - T_{TX,out}] + Pr[\mathcal{E}_k](1 - Pr[T_1 \leq T_l - T_{TX,out}]).$ The energy consumption at the cluster-head node ("$E_{rx}$") is given by the energy spent for idle listening, sending an acknowledgement packet and receiving a data packet. It is difficult to provide a closed form expression for the probabilities of these events, because they are highly cross-correlated among them and among different nodes. As a result, an accurate characterization would require modelling the probability that the receiving node is busy with the reception of a data packet while some other node is trying to send another data packet. Hence, by considering that the energy spent at the receiving node is small if compared to the energy spent at the transmitting node, the following upper bound is used:

$\mathbb{E}E_{rx} \leq R_s P_s + (R_l + T_{out})\max(P_{tx}, P_{rx}).$ where it is assumed that the receiving node can be listening for a time-out ("$T_{out}$"=fixed time out periods of the RX node for the data packet), after the end of the awake interval if an acknowledgement packet was transmitted just before the end of the awake interval.

Minimization of the Energy Consumption

Before using the expressions of the energy, delay and reliability just determined, it is necessary to determine the probability of busy channel when attempting transmission and the probability of communication collision during transmission.

Afterwards, optimal values of the duration of the awake interval and the duration of the sleep interval that reduce under a set threshold, for example minimize, the energy consumption may be determined.

According to the best embodiment of the present invention, both the probability of busy channel and the probability of communication are variable and are repeatedly (for example periodically) determined for each cluster during operation of the network and their values is then used for repeatedly determining optimal values of the duration of the awake interval and the duration of the sleep interval for each cluster-head node.

Determining Busy Channel Probability

Figure 3:
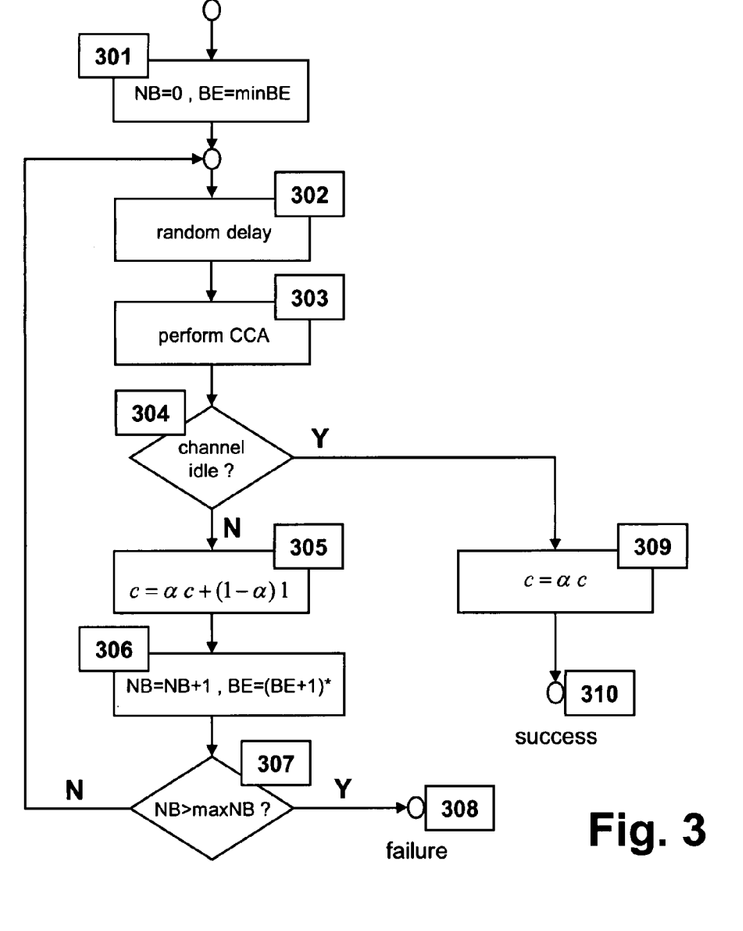
FIG. 3 shows a flowchart explaining a method for estimating the busy channel probability according to the present invention.

Busy channel probability is estimated at each non-cluster head node while attempting transmission of a packet (a preamble packet or data packet) to the cluster-head node. FIG. 3 shows a possible flowchart of the method for estimating the busy channel probability.

The estimate made by a node may be transmitted to the cluster-head node in the payload of a preamble packet; preferably, every time a preamble packet is transmitted to the cluster-head node, the transmitting node inserts into the payload its last estimate of the busy channel probability.

The cluster-head node may store the busy channel probability estimates received from its neighbouring nodes (for example one value for each neighbouring node) into a table; the busy channel probability to be used for the determination of the optimal operation parameters is preferably calculated as the average of the values stored in this table; alternatively, for example, the busy channel probability to be used for the determination of the optimal operation parameters may be calculated as the maximum of the values stored in this table.

The example of FIG. 3 refers to the case of unslotted IEEE 802.15.4 CSMA/CA [Carrier Sense Multiple Access with Collision Avoidance] mechanism: each node in the network has two variables: NB and BE. NB is the Number of Backoffs (that is a unit period of time for measuring a random period of time, which is called "random backoff time") used while attempting the current transmission; NB is initialized to 0 before every new transmission. BE is the Backoff Exponent, which is related to how many backoffs a node must wait before it attempts to assess the channel. The parameters that affect the random backoff time are minBE, maxBE and maxNB, which correspond to the minimum and maximum of BE and the maximum of NB respectively. NB is initialized to 0 and BE is initialized to minBE (step 301). The MAC layer delays for a random number of backoffs in the range from 0 to $2^{BE}-1$ (step 1 302) and then requests the physical layer to perform a CCA [Clear Channel Assessment] (step 303). The result of the CCA is considered (step 304): if the channel is busy (arrow N outgoing from block 304), the channel is not accessed and the MAC layer increments both NB and BE by one, ensuring that BE remains less than maxBE (step 306), if the channel is available (arrow Y outgoing from block 304) the channel is accessed and the method ends successfully (step 310). After incrementing NB and BE, a check is performed on the value of NB (step 307), namely whether the value of NB is more than maxNB; if the check is positive (arrow Y outgoing from block 307), the channel is not accessed and the method ends unsuccessfully (step 308); if the check is negative (arrow N outgoing from block 307), the MAC layer delays for a random number of backoffs using the updated values of NB and BE (step 302). The busy channel probability "c" is initialised to an initial value "$c_0$" and is updated during the above process: if the channel is busy (arrow N outgoing from block 304) it is updated to $c=\alpha c+(1-\alpha)1$ (step 305) and if the channel is available (arrow Y outgoing from block 304) its is updated to $c=\alpha c$ (step 309), wherein $\alpha$ is a weighting factor, for example 0.9 or 0.99.

Determining Collision Probability

A transmitting node might conclude that a collision has occurred to a transmitted preamble packet when no acknowledgement packet is received in reply thereto; anyway, the reason for the failure to get back an acknowledgement packet is, in most cases, that the destination node is sleeping during the transmission.

Figure 4:
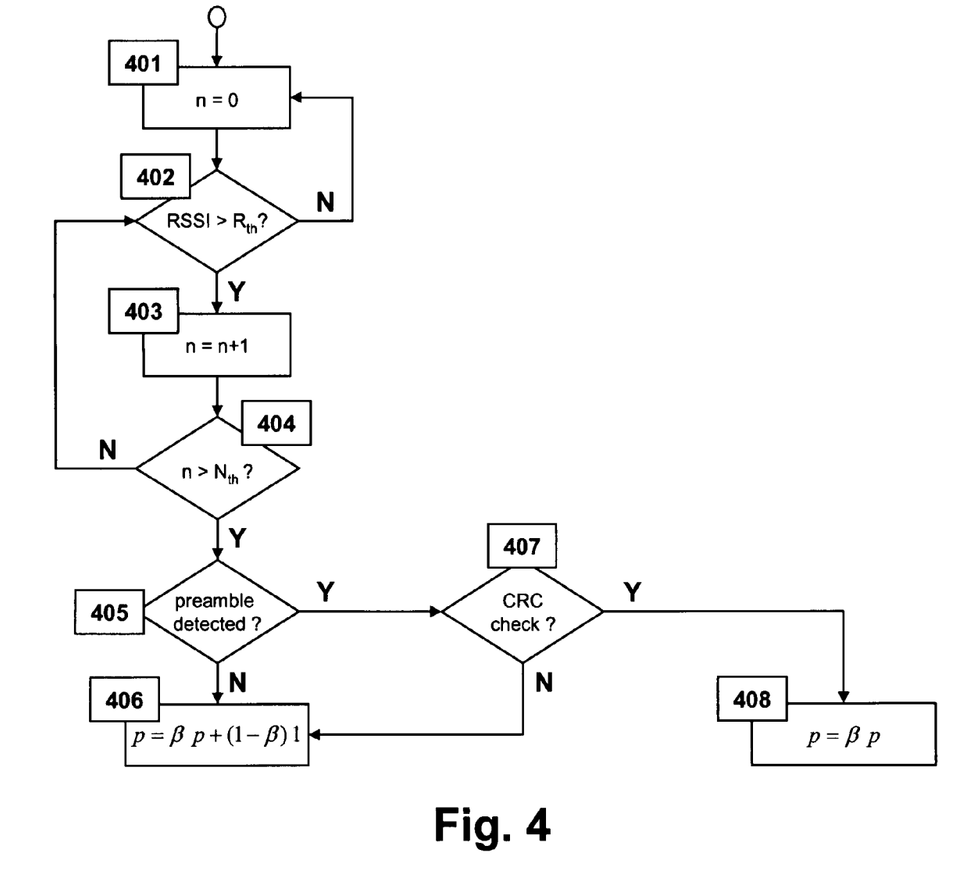
FIG. 4 shows a flowchart explaining a method for estimating the collision probability according to the present invention.

Therefore, according to the present invention, the collision probability is advantageously determined at the receiver (i.e. the cluster-head node) side, which is the cluster-head node. FIG. 4 shows a possible flowchart of the method for determining the collision probability at any reception attempt.

A counter "n" is initialized to 0 (step 401). The cluster-head node checks the RSSI [Received Signal Strength Indicator] (step 402). If the RSSI is more than the receiving threshold "$R_{th}$" (arrow Y outgoing from block 402), packets are being transmitted; otherwise (arrow N outgoing from block 402) packets are not being transmitted and the counter is reset (step 401). If there is transmission, the cluster-head node counts the number of symbols during which the RSSI is above the receiving threshold by incrementing counter "n" (step 403) and comparing its value with minimum number of symbols forming a packet "$N_{th}$" (step 404). If the number of symbols so counted is greater than $N_{th}$, (arrow Y outgoing from block 404) a packet is being received and a check is carried out on the preamble bits (step 405). If the preamble bits are not successfully detected (arrow N outgoing from block 405) the cluster-head node assumes there has been a collision and updates the collision probability to $p=\beta p+(1-\beta)1$ (step 406). If the preamble bits are successfully detected (arrow Y outgoing from block 405) the CRC [Cyclic Redundancy Check] is checked (step 407). If CRC does not check (arrow N outgoing from block 407) there has been a collision and the collision probability is updated to $p=\beta p+(1-\beta)1$ (step 406), if it does check (arrow Y outgoing from block 407) the collision probability is updated to $p=\beta p$ (step 408), wherein $\beta$ is a weighting factor, for example 0.9 or 0.99.

Optimization Problem

Given the expressions of the energy, delay and reliability as function of the durations of the sleep and awake intervals of the cluster-head, number of nodes, average data packet generation rate, busy channel and collision probability, the energy is minimized subject to reliability and delay constraints as follows:

$$\mathcal{P}: \min_{R_l, R_s, T_{TX,out}, T_{out}} E(R_l, R_s, T_{TX,out}, T_{out}, c, p, \lambda)$$

$$\text{s.t.} \quad D_{max}(R_l, R_s, T_{TX,out}, T_{out}, c, t_{max}) \leq \tau_{max},$$

$$R_{min}(R_l, R_s, T_{TX,out}, T_{out}, c, p) \geq \psi_{min},$$

where $\tau_{max}$ is the desired probability that the delay is less than $\tau_{max}$ and $\psi_{min}$ is the minimum desired probability with which a data packet should be transferred. In this optimization, c and p are feed-forward variables whereas $\lambda$, $t_{max}$, $\tau_{max}$ and $\psi_{min}$ are application requirements.

The solution of this minimization problem with respect to the operation parameters $R_s$ and $R_l$ can be obtained via standard numerical techniques. The person skilled in the art may determine, in each specific situation, values of the durations of the sleep and awake intervals of the cluster-head, number of nodes, average data packet generation rate, busy channel and collision probability that, subject to reliability and delay constraints, achieve energy levels that are below a set threshold, such threshold level being sufficiently close, from a practical point of view, to the minimum energy level. These values of the durations of the sleep and awake intervals of the cluster-head and of the other parameters indicated above that bring the energy level below the set threshold will be also considered as fulfilling the minimum energy condition.

According to an advantageous embodiment of the present invention, this minimization problem is solved offline, by means of e.g. a base station connected to the network, for many representative values of five variables, namely the total packet generation rate in the cluster (i.e. the number of nodes multiplied by the average data packet generation rate), collision and busy channel probabilities, delay and reliability constraints; in this way, the nodes of the network do not need a complex hardware for carrying out complicated calculations in real-time.

Figure 5:
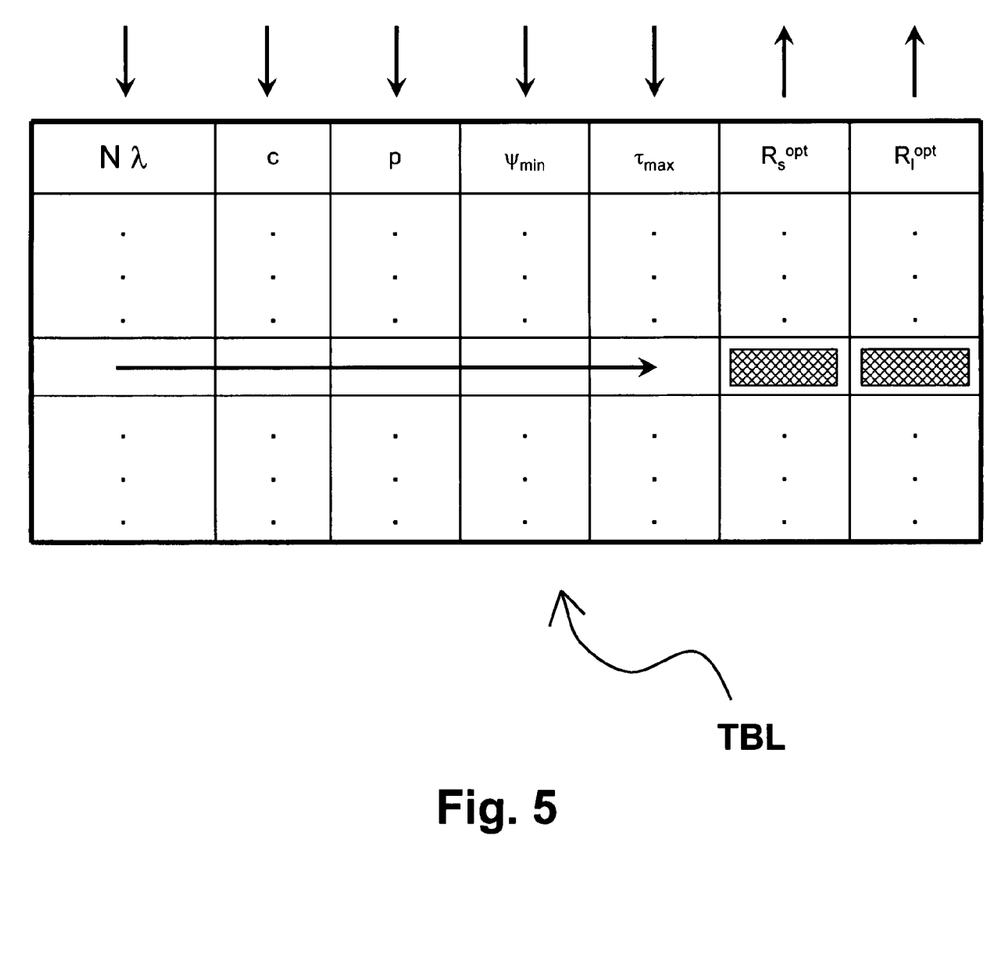
FIG. 5 shows a table of values used by a routing node for determining the optimal operation parameters according to the present invention.

The values of the five parameters as well as the corresponding pre-calculated optimal values $R_l^{opt}$ and $R_s^{opt}$ of the operation parameters $R_l$ and $R_s$ are stored into a table TBL like the one shown in FIG. 5 comprised in each of the cluster-head nodes of the network.

Figure 6:
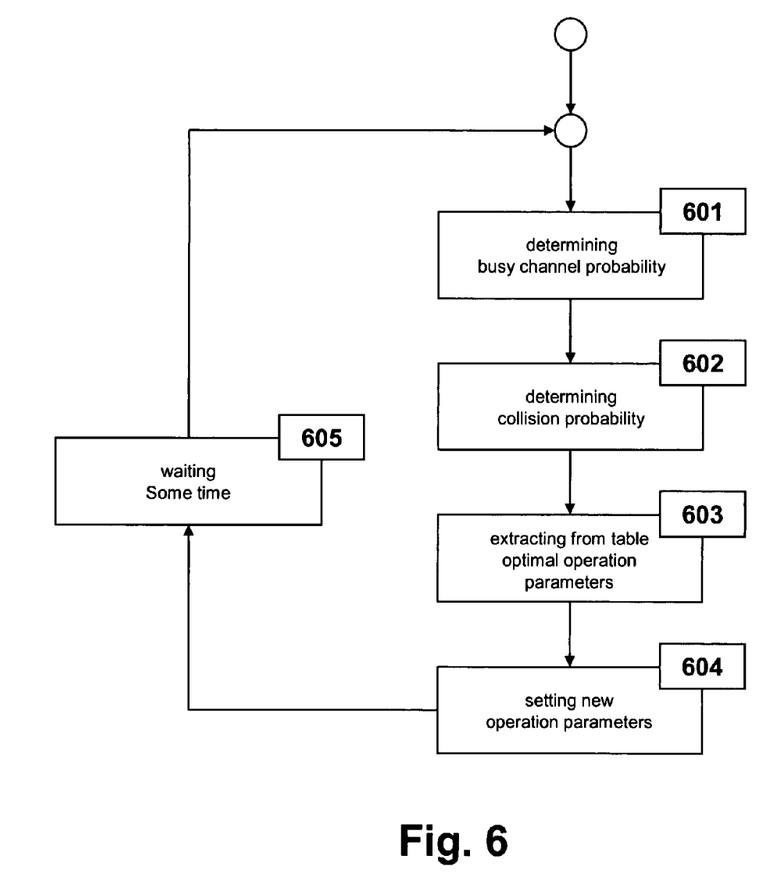
FIG. 6 shows a flowchart explaining a method of using the table of FIG. 5 by a routing node according to the present invention.

The method of using the table TBL of FIG. 5 (or a similar table) will be described with the help of the flowchart of FIG. 6 in relation to the cluster-head node of one of the clusters of the network.

At the initialization of the cluster-head node (that can be carried out by e.g. a base station) the values of three variables are stored into the cluster-head node: the total packet generation rate $N\lambda$ of its cluster, the desired probability $\tau_{max}$ that the delay is less than $t_{max}$, the minimum desired probability $\psi_{min}$ with which a data packet should be transferred; additionally, the operation parameters of the cluster-head node are set to e.g. default values. The cluster-head node receives from its neighbouring nodes the estimates of the busy channel probability and calculates their average (step 601); the cluster heads estimates the collision probability (step 602); using as entry points the values of the three variables, the calculated average busy channel probability and the estimated collision probability, two values of $R_l$ and $R_s$ are read from the table TBL corresponding to the optimal vales $R_l^{opt}$ and $R_s^{opt}$ that minimizes the energy consumption of the cluster (step 603) and are set as new operation parameters of the cluster-head node replacing the previous operation parameters (step 604); after that, the cluster-head node waits some time (step 605) before repeating the steps of the method.

The invention claimed is:

1. Method for setting operation of a routing node of an asynchronous wireless communication network, wherein said network includes a plurality of clusters, each of said clusters having one cluster-head node, wherein a cluster-head node is a routing node receiving data packets transmitted from other nodes of the cluster, the method comprising the steps of:
   A) for a cluster wherein said routing node is the cluster-head node, determining energy consumption, by the cluster-head node, as a function of parameters including probability of busy channel, probability of communication collision, probability of successfully transfer and average delay,
   B) for the cluster wherein said routing node is the cluster-head node, determining an awake interval and a sleep interval of said routing node as a function of the determined energy consumption by comparing the function of the determined energy consumption to a set of predetermined thresholds associated with predetermined values for probability channel being busy, probability of collision, probability of successful transfer, and average delay which is associated with a minimum energy consumption value, and
   C) setting the awake interval and the sleep interval of said routing node for processing data packets received from other nodes in the cluster based on the awake interval and the sleep interval determined in step B).

2. Method according to claim 1, further comprising the step of partitioning said network into the plurality of clusters each including one cluster-head node.

3. Method according to claim 1, wherein the determining in step A) includes determining the energy consumption as a function of the parameters further including a number of nodes in the cluster other than the cluster-head node and an average data packet generation rate at which the number of nodes in the cluster transmit data packets.

4. Method according to claim 1, further comprising periodically determining, by the cluster-head node, the probability of busy channel.

5. Method according to claim 4, wherein the determining of the probability of busy channel includes receiving estimates of the probability of busy channel made by the other nodes of the cluster and calculating an average or maximum of the received estimates.

6. Method according to claim 1, further comprising periodically determining, by the cluster-head node, the probability of communication collision by making estimates.

7. Method according to claim 1, wherein the determining in step B) includes retrieving the set of predetermined thresholds associated with the predetermined values from a table of values stored in the cluster-head node.

8. Node of an asynchronous wireless communication network including a plurality of clusters, the node being in a cluster with other nodes, the node comprising:
   a radio transceiver having an intermittent operation, the intermittent operation corresponding to a periodic sequence of an awake interval and a sleep interval, said radio transceiver being used at least for receiving data packets, and
   a processor configured to set the operation of the radio transceiver by
      determining energy consumption as a function of parameters including probability of busy channel, probability of communication collision, probability of successfully transfer and average delay,
      determining the awake interval and the sleep interval as a function of the determined energy consumption by comparing the function of the determined energy consumption to a set of predetermined thresholds associated with predetermined values for probability channel being busy, probability of collision, probability of successful transfer, and average delay which is associated with a minimum energy consumption value, and
      setting the awake interval and the sleep interval for processing data packets received from other nodes in the cluster to the determined awake interval and the determined sleep interval.

9. Asynchronous wireless communication network comprising:
   one or more routing nodes, each of the one or more routing nodes including
      radio transceiver configured to operate intermittently, intermittent operation corresponding to a periodic sequence of an awake interval and a sleep interval, said radio transceiver being used at least for receiving data packets, and a processor configured to set the operation of the radio transceiver by determining energy consumption as a function of parameters including probability of busy channel, probability of communication collision, probability of successfully transfer and average delay, determining the awake interval and the sleep interval as a function of the determined energy consumption by comparing the function of the determined energy consumption to a set of predetermined thresholds associated with predetermined values for probability channel being busy, probability of collision, probability of successful transfer, and average delay which is associated with a minimum energy consumption value, and setting the awake interval and the sleep interval for processing data packets received from other nodes in the cluster to the determined awake interval and the determined sleep interval.

10. Method for assigning an awake interval and a sleep interval to processing performed by a cluster head node, said method comprising:

determining energy consumption, by a cluster head node, as a function of parameters including probability channel is busy, probability of collision, probability of successful transfer, and average delay, wherein the parameters are associated with the channel between the cluster head node and network nodes in the same cluster as the cluster head node;

determining the awake interval and the sleep interval as a function of the determined energy consumption by comparing the function of determined energy consumption to a set of predetermined thresholds associated with predetermined values for probability channel being busy, probability of collision, probability of successful transfer, and average delay which is associated with a minimum energy consumption value; and assign the awake interval and the sleep interval associated with the minimum energy consumption value to the cluster head node for processing data received from the cluster network nodes.

11. Method according to claim 10, wherein the determining the energy consumption includes determining the energy consumption as a function of the parameters further including a number of the cluster network nodes and an average data packet generation rate at which the number of the cluster network nodes transmit data packets.

12. Method according to claim 11, further comprising periodically determining, by the cluster-head node, the probability of busy channel).

13. Method according to claim 12, wherein the determining of the probability of busy channel includes receiving estimates of the probability of busy channel made by the cluster network nodes and calculating an average or maximum of the received estimates.

14. Method according to claim 10, further comprising periodically determining, by the cluster-head node, the probability of communication collision by making estimates.

15. Method according to claim 10, wherein the determining of the awake interval and the sleep interval includes retrieving the set of predetermined thresholds associated with the predetermined values from a table of values stored in the cluster-head node.

* * * * *